July 17, 1962 R. R. FINK 3,044,157
APPARATUS FOR INSTALLING BUSHINGS
Filed June 30, 1960 2 Sheets-Sheet 2
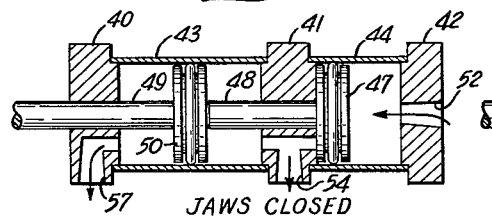
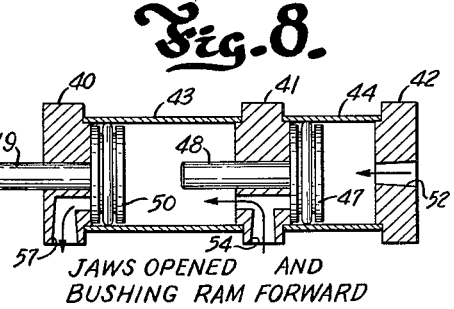
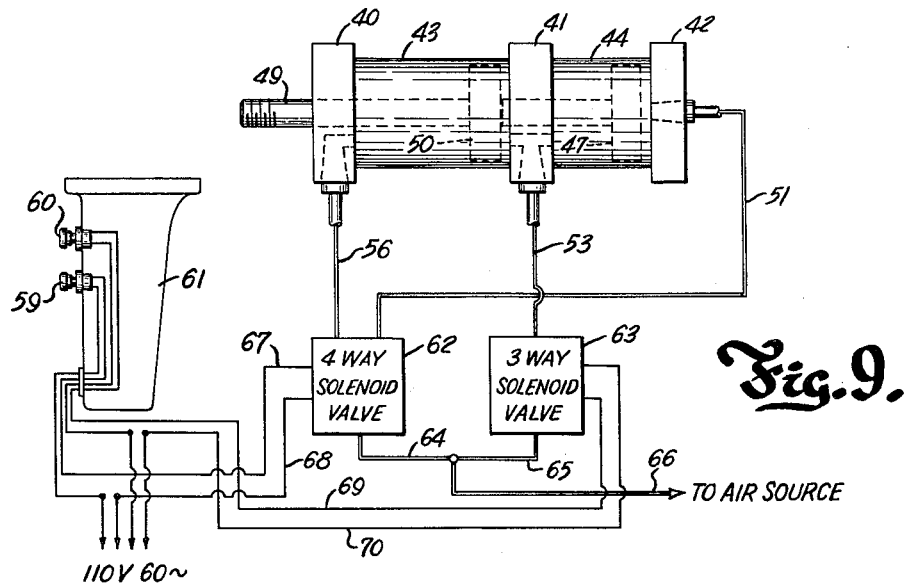
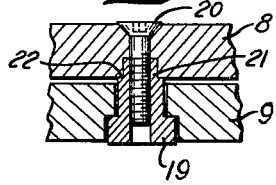
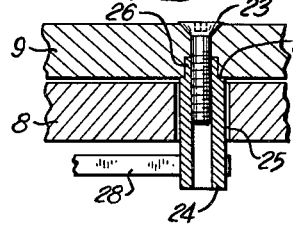
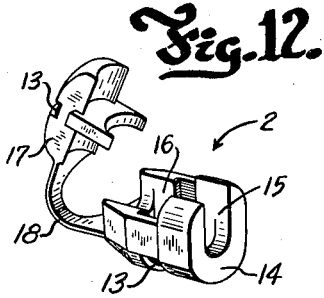
INVENTOR.
Richard R. Fink
BY
Andrus & Starke
Attorneys

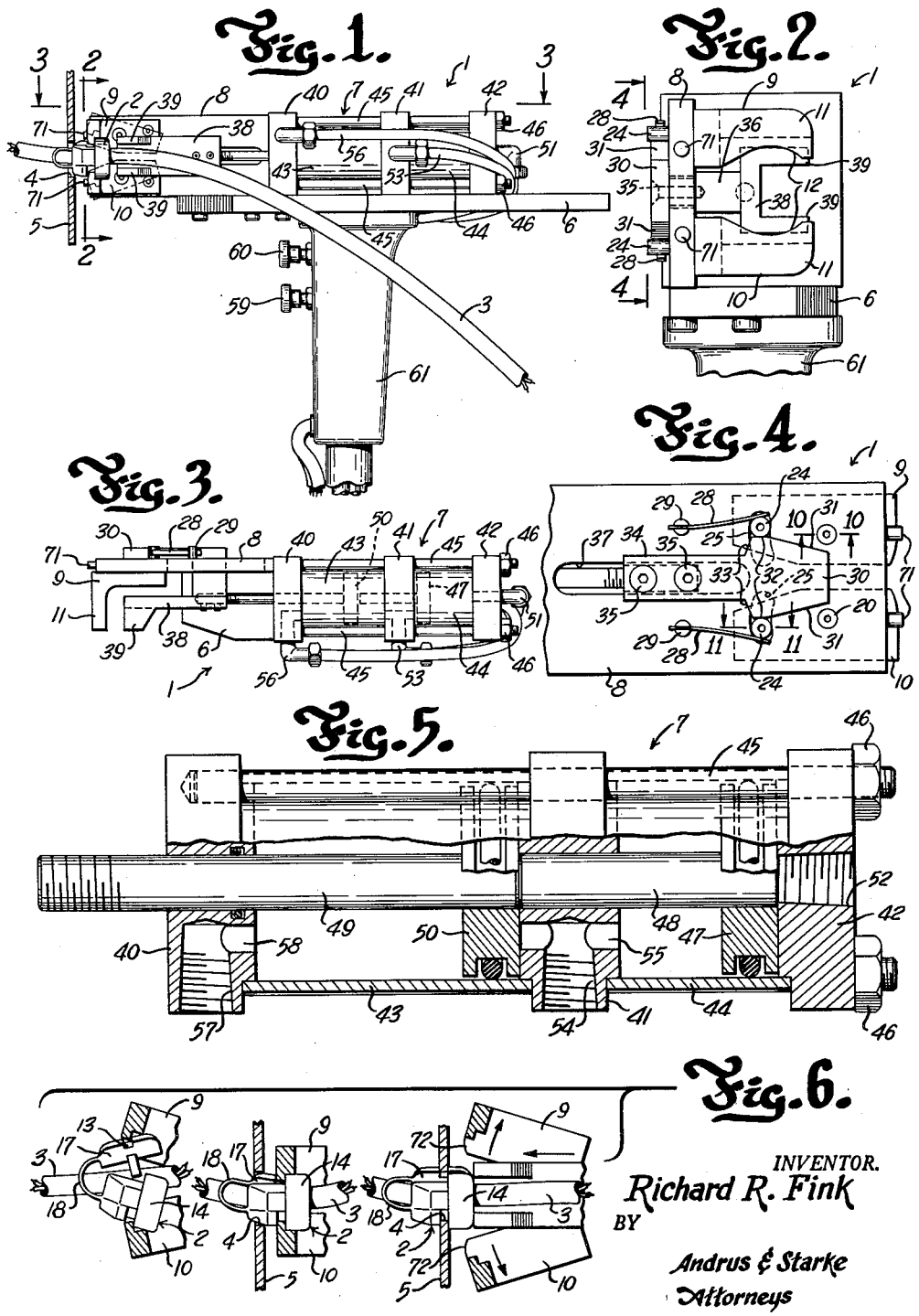

United States Patent Office 3,044,157
Patented July 17, 1962

3,044,157
APPARATUS FOR INSTALLING BUSHINGS
Richard R. Fink, Milwaukee, Wis., assignor to D. J. Campbell Co. Inc., Waukesha, Wis., a corporation of Wisconsin
Filed June 30, 1960, Ser. No. 40,003
9 Claims. (Cl. 29—235)

This invention relates to an apparatus for installing bushings and more particularly to an apparatus for installing strain relieving bushings for electrical power lines in openings in electrical equipment.

Strain relieving bushings are commonly used to connect electrical power lines within openings in junction boxes or other electrical equipment. The bushing, which is fabricated from an insulating material, firmly engages the power line and prevents relative movement between the power line and the junction box, thereby eliminating any strain on the electrical connection of the power line within the junction box. The bushing has the additional function of preventing wear or abrasion of the portion of the power line located within the opening of the junction box or other electrical equipment.

One of the most commonly used strain relieving bushings is a Heyco bushing which consists of a plastic body having an axial passage to receive the power line. The body is also provided with a longitudinal recess which receives a locking member which is attached to the body by a flexible strap. The locking member is adapted to be inserted within the recess in the body and bears against the power line. Both the body and the locking member are provided with circumferential grooves which are adapted to engage the wall of the junction box surrounding the opening and prevent axial movement of the bushing with respect to the box.

In the past, the strain relieving bushings have been installed by use of a manually operated pliers having jaws which engage the periphery of the bushing and force the locking member radially inward to thereby reduce the external diameter of the bushing. The bushing is then inserted within the opening and the resiliency of the cord forces the locking member outwardly into engagement with the wall of the junction box to lock the same within the opening. This procedure of installing the bushings by means of the hand operated pliers is slow and very fatiguing, for it requires a substantial force to compress the locking member to a size sufficient to permit insertion within the opening.

The present invention is directed to a power operated apparatus for installing strain relieving bushings within openings in electrical equipment which substantially increases the speed of assembly but also virtually eliminates the fatigue problem which accompanies the use of the conventional hand operated tool.

More specifically, the invention comprises a pair of cooperating jaws which are pivotally connected to a frame and are adapted to engage the peripheral surface of the bushing and depress the locking member within the recess of the body of the bushing. The jaws are operably connected to a cam which is secured to the piston rod of an air cylinder unit. In addition, a ram is connected to the piston rod and is located in a plane extending between the jaws so that the ram will engage the rear end of the bushing when the jaws are opened and drive the bushing within the opening.

The air cylinder unit which is employed to operate the cam and the ram is a double cylinder unit providing a two-stage movement or action for the piston rod. In the first stage of operation, the piston rod is moved outwardly in a given increment to correspondingly move the cam and close the jaws to thereby depress the locking member of the bushing. In the second stage, the piston rod is moved further outwardly to move the cam to a position where the jaws are opened and immediately thereafter force the ram against the bushing to insert the bushing within the opening. The natural spring-back of the locking member will serve to engage the groove of the bushing with the wall of the junction box to thereby firmly secure the bushing to the wall.

The present invention increases the speed of assembly of the bushings within the openings and is particularly adaptable for assembly line operations. As the cylinder unit is operated by fluid pressure, the fatigue problem is substantially eliminated which results in an increased work capacity.

Other objects and advantages will appear in the course of the following description.

The drawings illustrate the best way presently contemplated of carrying out the present invention.

In the drawings:
FIGURE 1 is a side elevation of the apparatus of the invention;
FIG. 2 is a fragmentary front view of the apparatus taken along line 2—2 of FIG.1;
FIG. 3 is a top plan view of the apparatus taken along line 3—3 of FIG. 1;
FIG. 4 is an enlarged fragmentary side elevation of the rear of the apparatus taken along line 4—4 of FIG. 2 and showing the cam construction;
FIG. 5 is an enlarged plan view of the cylinder unit with parts broken away in section;
FIG. 6 is a three step diagrammatic view showing the operation of the apparatus in assembling a bushing within an opening;
FIG. 7 is a longitudinal section of the cylinder unit showing the position of the pistons when the jaws are in the closed position;
FIG. 8 is a view similar to FIG. 7 and showing the position of the pistons when the jaws are in the open position;
FIG. 9 is a diagrammatic showing of the electrical system for operating the cylinder unit;
FIG. 10 is an enlarged section 10—10 of FIG. 4 showing the pivotal connection of the jaw to the frame;
FIG. 11 is an enlarged section taken along line 11—11 of FIG. 4 showing the attachment of the cam following pin to the jaw; and
FIG. 12 is a perspective view of a typical bushing.

The drawings illustrate an apparatus or tool 1 adapted to install a dielectric strain relieving bushing 2, which is clamped to a power cord 3, within an opening 4 in the wall of a junction box or other article.

The tool 1 includes a base or frame which supports a cylinder unit 7 and a vertical plate 8. The plate 8 is bolted edgewise to base 6 and projects forwardly beyond the end of the base.

A pair of cooperating jaws 9 and 10 are pivotally connected to the plate 8 and each jaw is provided with a laterally extending forward portion 11 having a generally arcuate or curved clamping edge 12 which is adapted to engage the groove 13 in the bushing 2.

The bushing 2, as shown in the drawings, forms no part of the present invention and may be any conventional type of electrically insulating bushing such as that sold under the trade name of Heyco.

The bushing 2 includes a body portion 14 having an axial opening 1 to receive the power cord 3 and having a radially extending recess 16 which receives a locking member 17 adapted to clamp the cord to the body portion. The body portion 14 and locking member 17 are integrally connected by a flexible strap 18.

As best shown in FIG. 6, both the body portion 14 and locking member 17 are provided with the circumferential groove 13 which is adapted to be engaged by the clamping edges 12 of the jaws 9 and 10 during installation of the bushing and is adapted to engage the portion of the wall 5 bordering the opening 4 when installed, thereby preventing relative movement of the cord 3 with respect to the wall 5.

The jaws 9 and 10 are pivotally connected to the support plate 8, as shown in FIG. 10. An externally stepped plug 19 having an internal thread is disposed within a complementary recess in jaw 9 and a screw 20 extends through an opening in the plate 8 and is threaded into the plug. The inner end 21 of plug 19 has a reduced diameter and is received within a recess in the plate 8. The shoulder 22 at the base of inner portion 21 bears against the inner surface of plate 8 and thereby maintains the adjacent surfaces of jaw 9 and plate 8 out of contact and facilitates pivotal movement of the jaws with respect to the plate 8.

To pivot the jaws 9 and 10 with respect to plate 8, a screw 23 extends within an opening in each jaw and is threadedly engaged within a central opening in a pin 24 or cam follower which is disposed within a curved or arcuate slot 25 formed in plate 8. The inner end 26 of pin 24 is provided with a reduced diameter and is received within a recess in the jaw. The shoulder 27 at the base of the inner portion 26 bears against the surface of the jaw and prevents frictional contact between the adjacent surfaces of the jaw and plate 8 during pivotal movement of the jaw.

As best shown in FIG. 11, the outer end of each pin 24 projects beyond the plate 8 and is engaged by a leaf spring 28 which urges each pin toward the longitudinal center of plate 8. Each leaf spring 28 is secured within a slot in a boss 29 connected to plate 8.

The leaf springs 28 serve to urge the pins 24 toward each other and thereby bias the jaws 9 and 10 to the open position.

The pins 24 are moved outwardly within slots 25 to thereby pivot the jaws 9 and 10 to the closed position by a cam 30. As shown in FIG. 4, the cam 30 is provided with a pair of rearwardly diverging surfaces 31 which engage the respective pins 24 and move the pins outwardly within the slots 25 as the cam is moved forwardly. The cam 30 is also formed with a pair of generally parallel, horizontal surfaces 32 which are located at the high end of each of the sloping surfaces 31, and a pair of steeply sloped surfaces 33 connect the surfaces 32 with the body portion 34 of the cam. The surfaces 31, 32 and 33 may or may not be symmetrical with respect to the longitudinal center line of the cam. In some cases, it may be desired to have the lower jaw 10 open to greater extent than the upper jaw 9 in order to insure that the lower, deeper rear portion of the body 14 of the bushing will clear the jaw when the bushing is pushed forward into the opening 4.

To move the cam 30 and thereby actuate the jaws 9 and 10, the body portion 34 of the cam is connected by screws 35 to transverse bar 36 which extends through a slot 37 in plate 8 and is connected to a ram 38. The ram 38 is provided with a generally U-shaped forward end, having a pair of spaced flanges 39 which extend laterally from the ram. The flanges 39 straddle the cord 3 and are adapted to engage the rear of the bushing 2 and drive the bushing into the opening 4 after the jaws 9 and 10 are opened.

The cam 30 and ram 38 are adapted to be moved in two stages or increments. To begin operation, the cam 30 and ram 38 are in the rearmost position with the forward tip of the cam being located between pins 24 and the jaws 9 and 10 being in the open position. In the first stage of movement, the ram 38 and cam 30 are moved forwardly to a position where the pins 24 are in contact with the high end surfaces 32, thereby closing the jaws and clamping the bushing elements together. In the second stage of movement, the ram 38 and cam 30 are moved further forward, thereby riding pins 24 down the steep surfaces 33 to open the jaws and thereafter moving the ram forwardly into engagement with the bushing to drive the bushing within the opening 4 in wall 5. The ram is positioned so that it is spaced a substantial distance from the bushing when the cam following pins 24 are in alignment with surfaces 33. As there may be some lag or delay in the actions of springs 28 in urging pins 24 along the inclined surfaces 33, this insures that the jaws will be open before the ram engages the bushing.

The ram 38 and cam 30 are actuated in the two stage movement by cylinder unit 7 which is supported on base 6. The cylinder unit 7 comprises a forward head 40, a central head 41 and a rear head 42 which are bolted to the base 6. The heads 40 and 41 enclose the opposite ends of a forward cylinder 43, while the central head 41 and rear head 42 enclose the opposite ends of a rear cylinder 44 which has a shorter length than cylinder 43. To connect the heads together, a series of tie rods 45 are threaded into tapped openings in forward head 40 and extend rearwardly through aligned openings in central head 41 and rear head 42. The threaded rear ends of tie rods 45 receive nuts 46 which serve to draw the heads together.

A piston 47 is slidably disposed within cylinder 44 and the piston rod 48 extends forwardly through an axial opening in central head 41 into the forward cylinder 43 and abuts against the rear end of piston rod 49 which carries forward piston 50. The forward end of piston rod 49 extends outwardly through an axial opening in forward head 40 and is connected to ram 38.

Air or other hydraulic fluid is introduced into rear cylinder 44, to move piston 47 forwardly, through a conduit 51 which is threadedly engaged within an axial opening 52 in rear head 42. The introduction of fluid through conduit 51 into cylinder 44 will move piston 47 forwardly and, as piston rod 48 is in engagement with piston rod 49, the piston 50 will correspondingly be moved forward within cylinder 43. As the forward cylinder 43 has a greater length than rear cylinder 44, the forward piston 50 will not move the entire length of the cylinder 43 when actuated by rear piston rod 48 but instead, will stop at a location spaced from the forward head 40.

The cylinder construction and cam are designed so that when the rear piston 47 is in its rearmost position, against rear head 42, the forward tip of the cam 30 will be disposed between the pins 24 so that the jaws 9 and 10 will be in the open position, and when the rear piston 47 is in its forwardmost position, against central head 41, the pins 24 are in contact with the high points 32 of the cam so that the jaws are then closed.

To move the forward piston 50 further forward in cylinder 43 to provide the second increment of movement for the ram 38 and cam 30, air or other fluid is introduced into both cylinders 43 and 44 by means of a supply conduit 53. The conduit 53 is threadedly engaged within a radial tapped opening 54 in central head 41 and the inner end of opening 54 communicates with a longitudinal passage 55 which extends between cylinders 43 and 44. By introducing fluid through conduit 53 to cylinder 43, the forward piston 50 is moved forwardly to thereby move the ram 38 and cam 30 forwardly. This results in the pins 24 riding toward each other along surfaces 33 to open the jaws 9 and 10 and to simultaneously move the ram 38 forwardly toward the bushing to force the bushing into the opening.

Fluid is also supplied to the forward end of cylinder 43 to return the piston 50 to its rear position after the bushing has been installed by means of a conduit 56 which is threadedly connected within a radial opening 57 in forward head 40. A longitudinal port 58 provides communication between the inner end of opening 57 and cylinder 43. This will return both the ram 38 and cam 30 to their original positions.

The flow of fluid into the cylinder unit 7 is controlled by a pair of press buttons 59 and 60 which are disposed in the forward wall of a handle 61 bolted to base 6. As shown in FIG. 9, conduits 51 and 56 are connected to a conventional four-way solenoid operated valve 62, while conduit 53 is connected to a three-way solenoid operated valve 63. Fluid is supplied to the inlet port of the valves 62 and 63 by conduits 64 and 65, respectively, and a common supply conduit 66 connects the conduits 64 and 65 to a source of air or other fluid pressure.

The valve 62 is connected to a source of electrical power by leads 67 and 68 and the button 59 is connected in series with the leads and serves, when manually depressed, to complete the circuit to energize solenoid valve 62. Similarly, valve 63 is connected to a source of electrical power by leads 69 and 70 and button 60 is connected in series with the leads and serves, when manually depressed, to complete the circuit and energize the solenoid valve 63.

In operation of the apparatus, the pistons 47 and 50 are initially in their rearmost positions so that the ram 38 is withdrawn and the cam following pins 24 are in engagement with the forward portion of sloping surfaces 31 so that the jaws 9 and 10 are in the open position. With the apparatus in this position, the operator locates the power cord 3 within the central opening 15 of bushing 2 and inserts the locking member 17 within the recess 16 of the body portion 14 of the bushing. The operator then places the bushing 2 on the lower jaw 10 with the clamping edge 12 of the jaw within the peripheral groove 13 of the bushing, as shown in the lefthand view in FIG. 6. The power cord 3 extends between the flanges 39 of ram 38 as shown in FIGURE 1.

With the bushing positioned on the lower jaw 10, the operator depresses button 59 which actuates solenoid valve 62 to admit air through conduit 51 to the rear cylinder 44. The air pressure forces the rear piston 47 forwardly and correspondingly moves the forward piston 50 forwardly within cylinder 43. Conduits 53 and 56 are open to the atmosphere through valve 63 so that the air ahead of the pistons will be exhausted. The forward movement of piston 50 results in ram 38 and cam 30 being moved forwardly and the cam following pins 24 ride outwardly on the sloping surfaces 31 to surfaces 32 to thereby pivot the jaws about plate 8 and move the clamping edges 12 to the closed position. As shown in the central view of FIG. 6, the clamping edge 12 of the upper jaw 9 engages the groove 13 in locking member 17 and depresses the locking member within the recess 16 to firmly clamp the power cord 3 and to reduce the overall diameter of the bushing.

The tool 1 is then moved manually toward the wall 5 so that the forward portion of the bushing 2 will be disposed within the opening 4. As best shown in FIGS. 2 and 4, a pair of stops 71 extend outwardly from the forward edge of plate 8 and are adapted to engage the wall 5 and thereby properly space the jaws 9 and 10 from the wall.

With the bushing partially inserted within the opening, the operator, while holding button 59 in the depressed position, also depresses button 60 to thereby actuate solenoid valve 63 and introduce air through conduit 53 to the central head 41. As air pressure is still being applied through conduit 51, the air entering through conduit 53 will move the forward piston 50 ahead as shown in FIG. 8. This further forward movement of piston 50 moves the cam 30 forward so that cam follower pins 24 ride inwardly on surfaces 33 to quickly open the jaws 9 and 10. Simultaneously, the ram 38 is moved forward toward the rear end of the bushing, as shown in the righthand view of FIG. 6, to thereby drive the bushing into the opening. The length of the final stroke of the ram is designed so that the groove 13 will be in registry with the walls 5 bordering the opening 4 and the locking member 17 will then spring-back or rebound outwardly so that the wall is engaged within the groove 13 to firmly hold the bushing 2 within the opening 4 in wall 5.

The front edges 72 of the jaws 9 and 10 are curved to permit the jaws to pivot between the closed and open position without contacting the wall 5.

The buttons 59 and 60 are then released, thereby de-energizing the solenoid valves 62 and 63 and allowing air pressure to pass through conduit 56 to the forward portion of cylinder 43. This results in forward piston 50 being moved rearwardly and the piston rod 49 engages piston rod 48 to force the rear piston rearwardly within cylinder 44 to its original position.

The tool of the invention is designed to accurately and quickly install bushings within an opening in a wall or other object. As the tool is power operated, the fatigue problem which normally accompanies the conventional manual method is eliminated, which results in an overall production increase.

While the description is directed to a hand operated tool, it is contemplated that the apparatus may be bench mounted for assembly line operations or the like. Similarly, while the bushing is shown to be a two-piece type connected by a flexible strap, the invention is also adaptable for use with separate two-piece bushings or any other type of tubular elements which are adapted to be compressed and subsequently driven into an opening.

Various modes of carrying out the invention are contemplated as being within the scope of the following claims particularly pointing out and distinctly claiming the subject matter which is regarded as the invention.

I claim:

1. An apparatus for installing a bushing within an opening in an article, comprising a frame, a pair of cooperating jaws pivotally connected to the frame and pivotable from an open position to a closed position in which the jaws are adapted to be in engagement with the peripheral surface of the bushing to compress said bushing in a radial direction, cam means carried by the frame and operably connected to at least one of said jaws for moving said jaws from the open position to the closed position, a ram slidably connected to the frame and disposed in a plane between the jaws and adapted to engage the rear end of the bushing and move the bushing into the opening in the article after the jaws are moved to the open position, and drive means connected to both said cam means and said ram for actuating said cam means and moving said ram to thereby open said jaws and move said ram between the opened jaws to push the bushing into the opening.

2. An apparatus for installing a bushing within an opening in an article, comprising a frame, a pair of cooperating jaws pivotally connected to the frame and pivotable from an open position to a closed position in which the jaws are adapted to be in engagement with the peripheral surface of the bushing to compress said bushing in a radial direction, cam means carried by the frame and operably connected to at least one of said jaws for moving said jaws from the open position to the closed position, a ram slidably connected to the frame and disposed in a plane between the jaws and adapted to engage the rear end of the bushing and move the bushing into the opening in the article when the jaws are moved to the open position, and means for moving said cam means and said ram in a two-step movement with the first step operating to pivot the jaws to the closed position to thereby decrease the peripheral dimension of the bushing and the second step operating to pivot the jaws to the open position and to simultaneously move the ram toward the bushing to thereby drive the bushing into the opening of the article.

3. An apparatus for installing an article in an opening, comprising a frame, a pair of jaws, pivotal means for pivotally connecting the central portion of each jaw to the frame, one end of each jaw defining a clamping edge disposed to cooperate with the clamping edge of the other jaw, resilient means operably connected to each jaw for urging the clamping edges of the jaws away from each other to an open position, cam means operably engageable with the opposite end of each jaw for pivoting the jaws about the pivotal means and moving the clamping edges toward each other to a closed position in which the clamping edges are adapted to engage the peripheral surface of the article, a ram carried by the frame and disposed in a plane extending between the jaws and adapted to be moved into contact with the article and drive the same into the opening as the clamping edges are moved to the open position, and drive means connected to both said cam means and said ram for simultaneously actuating said cam means and moving said ram to thereby open said jaws and move said ram between the opened jaws to push the article into the opening.

4. An apparatus for installing an article in an opening, comprising a frame, a pair of jaws, pivotal means for pivotally connecting the central portion of each jaw to the frame, one end of each jaw defining a clamping edge disposed to cooperate with the clamping edge of the other jaw, resilient means operably connected to each jaw for urging the clamping edges of the jaws away from each other to an open position, a cam follower connected to the opposite end of each jaw, a cam carried by the frame and having a pair of cam surfaces with the cam follower of one jaw disposed to ride on one cam surface and the cam follower of the other jaw disposed to ride on the other cam surface, means for moving the cam to a first position to thereby pivot the jaws against the force of the resilient means and move the clamping edges toward each other to a closed position in which the clamping edges are adapted to engage the peripheral surface of the article, a movable ram carried by the frame, and means for moving said cam to a second position whereat said resilient means pivots said jaws and moves the clamping edges to an open position and for simultaneously moving said ram in a direction extending between said jaws to thereby move the ram into engagement with the article as the clamping edges pivot to an open position to drive the article into the opening.

5. An apparatus for installing a bushing secured to a power cord within an opening in an article, comprising a frame including a support plate, a pair of cooperating jaws disposed generally flatwise with respect to one surface of the support plate and pivotally connected thereto, said jaws having forward clamping edges and being pivotable from an open position to a closed position in which the clamping edges are adapted to engage the peripheral surface of the bushing, cam means disposed on the opposite surface of said support plate from said jaws, cam following means connected to the rear portion of each jaw and extending through an opening in said support plate and engagable with said cam means, drive means for moving the cam means in a forward and rear direction with said cam means being movable from a rear position to a forward position in a two-stage movement with the first stage of movement acting to pivot the jaws and move the clamping edges to a closed position to clamp the bushing therebetween and the second stage of movement acting to move the clamping edges to the open position to release the bushing, and a ram slidably connected to the support plate and disposed in substantially the same plane with said jaws, said ram being movable in a direction corresponding to the direction of movement of said cam means to thereby engage the rear end of the bushing when the clamping edges move to the open position and drive the bushing into the opening in the article.

6. An apparatus for installing a bushing within an opening in an article, comprising a frame, a pair of cooperating jaws pivotally connected to the frame and pivotable from an open position to a closed position in which the jaws are adapted to be in engagement with the peripheral surface of the bushing to compress said bushing in a radial direction, cam means carried by the frame and operably connected to at least one of said jaws for moving said jaws from the open position to the closed position, a ram slidably connected to the frame and disposed in a plane between the jaws and adapted to engage the rear end of the bushing and move the bushing into the opening in the article as the jaws are moved to the open position, a first cylinder, a first piston slidably disposed within said first cylinder and having a piston rod extending through the forward end of said cylinder and connected to said ram and to said cam means, a second cylinder disposed axially rearward with respect to the first cylinder and having a shorter length than said first cylinder, a second piston disposed within said second cylinder and having a piston rod extending through the forward end of said second cylinder and projectable within the rear end of said first cylinder and adapted to engage said first piston, means for introducing fluid into the rear end of said second cylinder to move said second piston forwardly and engage said piston rod of said second piston with said first piston to correspondingly move the first piston forwardly within said first cylinder and thereby move the cam means to a first position and close the jaws, and means for introducing fluid into the rear end portion of said first cylinder to move said first piston further forward and thereby move said cam means to a second position and open the jaws and simultaneously move said ram between the open jaws into engagement with the bushing to drive the bushing into the opening.

7. An apparatus for installing a bushing within an opening in an article, comprising a frame, a pair of cooperating jaws pivotally connected to the frame and pivotable from an open position to a closed position in which the jaws are adapted to be in engagement wtih the peripheral surface of the bushing to compress said bushing in a radial direction, cam means carried by the frame and operably connected to at least one of said jaws for moving said jaws from the open position to the closed position, a ram slidably connected to the frame and disposed in a plane between the jaws and adapted to engage the rear end of the bushing and move the bushing into the opening in the article as the jaws are moved to the open position, a first cylinder, a first piston slidably disposed within said first cylinder and having a piston rod extending through the forward end of said cylinder and connected to said ram and to said cam means, a second cylinder disposed axially rearward with respect to the first cylinder, a second piston slidably disposed within said second cylinder and having a piston rod extending through the forward end of said second cylinder and projectable within the rear end of said first cylinder and adapted to engage said first piston, means for providing a shorter length of stroke for said second piston than for said first piston, means for introducing fluid into the rear end of said second cylinder to move said second piston forwardly and engage said piston rod of said second piston with said first piston to correspondingly move the first piston forwardly within said first cylinder and thereby move the cam means to a first position and close the jaws, means for introducing fluid into the rear end portion of said first cylinder to move said first piston further forward and thereby move said cam means to a second position and open the jaws and simultaneously move said ram between the open jaws into engagement with the bushing to drive the bushing into the opening, and means for introducing fluid into the forward end of the first cylinder to return the first piston to its original position in said first cylinder.

8. An apparatus for installing a bushing in an opening, comprising a frame, a pair of jaws, pivotal means for pivotally connecting the central portion of each jaw to the frame, one end of each jaw defining a clamping edge disposed to cooperate with the clamping edge of the other jaw to thereby clamp the article therebetween, resilient means operably connected to each jaw for urging the clamping edges of the jaws away from each other to an open position, cam means operably engageable with the opposite end of each jaw for pivoting the jaws about the pivotal means and moving the clamping edges toward each other to a closed position, a ram separate from said cam means and carried by the frame and disposed in a plane extending between the jaws, said ram being movable in said plane in a fore and aft direction from a first position to the rear of said jaws to a second position in alignment with said clamping edges, means operably connected to the cam means for moving the jaws to a closed position to clamp the article between the clamping edges, and means operably connected to the jaws and to the ram for opening the jaws and for simultaneously moving the ram forwardly to said second position to engage the end of the bushing and drive the bushing into the opening as said jaws are moved to the open position.

9. The structure of claim 8 in which the ram is provided with a fore and aft extending slot for receiving a cord connected to the bushing and serving to maintain alignment of the cord during the installation operation.

References Cited in the file of this patent

UNITED STATES PATENTS

| | | |
|---|---|---|
| 444,755 | Casse | Jan. 13, 1891 |
| 1,561,341 | Martin | Nov. 10, 1925 |
| 2,433,640 | Wright | Dec. 30, 1947 |
| 2,485,805 | Bent | Oct. 25, 1949 |
| 2,714,906 | Peterson | Aug. 9, 1955 |

UNITED STATES PATENT OFFICE
CERTIFICATE OF CORRECTION

Patent No. 3,044,157                 July 17, 1962

Richard R. Fink

It is hereby certified that error appears in the above numbered patent requiring correction and that the said Letters Patent should read as corrected below.

Column 2, line 41, after "section" insert -- taken along line --; line 51, after "base" insert -- 6 --; same column 2, line 65, for "opening 1" read -- opening 15 --.

Signed and sealed this 30th day of October 1962.

(SEAL)
Attest:

ERNEST W. SWIDER
Attesting Officer

DAVID L. LADD
Commissioner of Patents